United States Patent Office 2,823,363
Patented Feb. 11, 1958

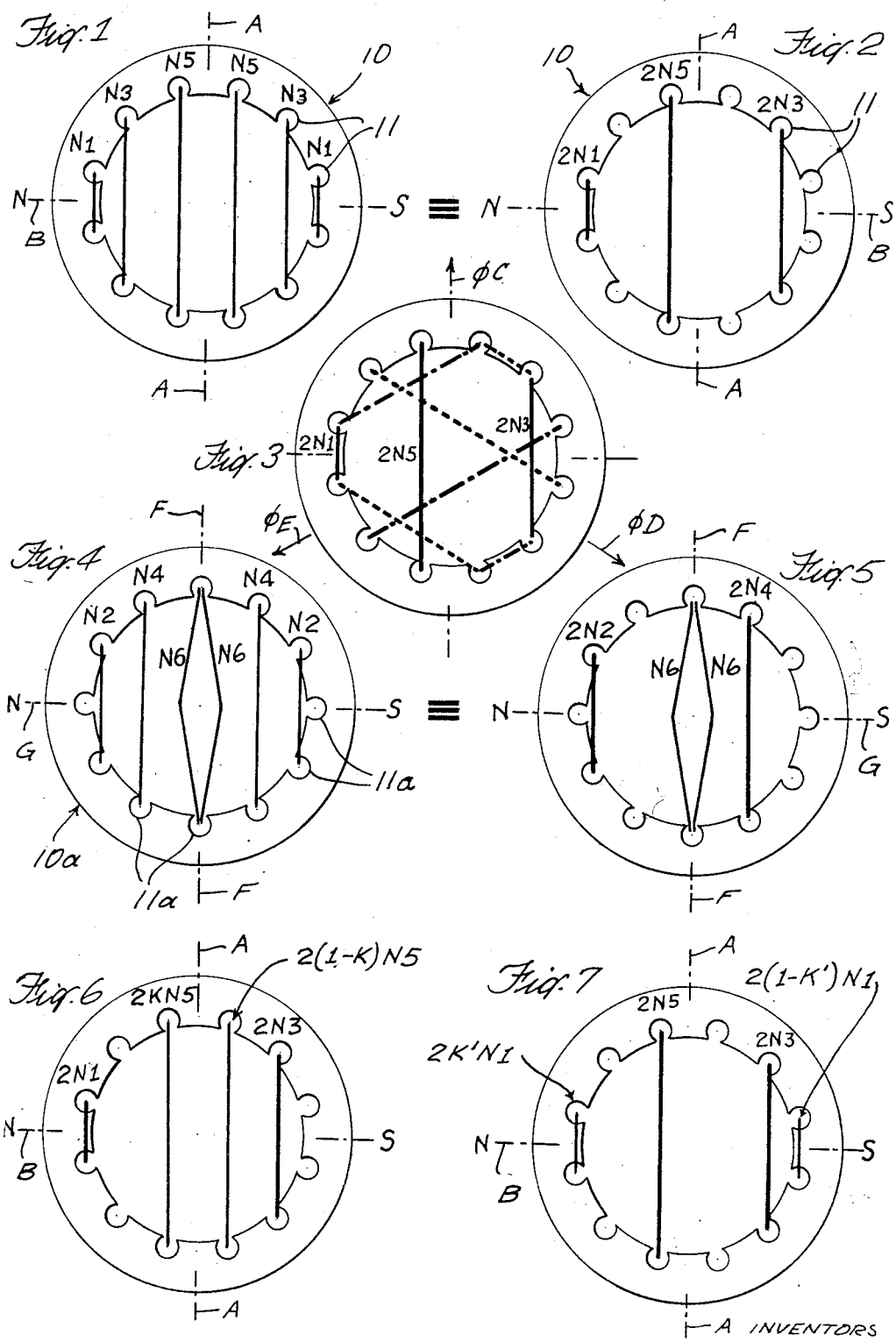

2,823,363

WINDINGS IN TWO POLE ELECTRICAL MACHINERY

Henry F. McKenney, Valley Stream, and George F. Schroeder, West Hempstead, N. Y., and Kimon C. Demetriou, Malibu, Calif., assignors to Sperry Rand Corporation, a corporation of Delaware Application February 26, 1954, Serial No. 412,749

5 Claims. (Cl. 336—120)

The present invention relates to electrical precision instruments of the inductive type having relatively rotatable inductively coupled parts, such as resolvers, rate generators, synchros, potentiometers and the like and more particularly to the distributed windings for those rotor or stator elements of such instruments, having an even number of coil receiving slots.

One object of the present invention is to provide a new and improved coil distribution pattern for the windings of the stator or rotor element of an electric device of the class described, this coil distribution pattern being such as to reduce the number of coils required, without substantially affecting the output or electrical performance, and thereby to reduce the cost of labor involved in winding these coils and tying them together.

The winding of either one of the inductively coupled relatively rotatable elements of an electric device having an even number of slots can be reduced to an inductively corresponding basic winding, in which the coils for each pair of poles per phase are arranged in parallel position (except for any center split coils) normal to the polar axis of the element and are balanced about the axis normal to the polar axis to obtain identical windings symmetrically arranged on opposite sides of said normal axis. In such a basic arrangement, each coil on one side of the normal axis, including any center split coils, would have a counterpart mate on the other side of the normal axis with the same number of turns, both coils of a mating pair being symmetrically arranged about said normal axis. In accordance with the present invention, this basic coil pattern for any one phase is replaced in whole or in part by an electrically equivalent winding, having a less number of coils, without substantially affecting the output or electrical performance of the device. This equivalent winding for each phase of the rotor or stator, consists of coils arranged in parallel position (except for any center split coils) normal to the polar axis of the stator or rotor, each of one or more of the mating pairs of coils of the basic pattern being replaced by a single coil combining the turns of the mating pair of coils it replaces. This equivalent arrangement permits reduction in the number of coils, without substantially affecting electrical performance, so that cost of manufacturing is reduced.

Various other objects, features and advantages of the present invention are apparent from the following description and from inspection of the accompanying drawings, in which:

Fig. 1 is a diagram of a type of basic winding pattern from which a reduced electrically equivalent winding pattern of the present invention may be derived;

Fig. 2 is a diagram of a single phase winding pattern of the present invention reduced from and electrically equivalent to the basic winding pattern of Fig. 1;

Fig. 3 is a diagram of a polyphase winding pattern of the present invention, each phase of this winding being reduced from and electrically equivalent to a basic winding pattern similar to that of Fig. 1;

Fig. 4 is a diagram of another type of basic winding pattern from which a reduced electrically equivalent winding pattern of the present invention may be derived;

Fig. 5 is a diagram of a single phase winding pattern of the present invention reduced from and electrically equivalent to the basic winding pattern of Fig. 4; and Figs. 6 and 7 are diagrams of other forms of winding patterns of the present invention reduced from and electrically equivalent to the basic winding pattern of Fig. 1, but having a modified distribution to attain balanced voltage per pole.

Referring to Fig. 1 of the drawing, there is shown an element 10 of an electric rotary inductive device of the general type described. This element is indicated as the stator of a two-pole electric rotary inductive device, although as far as certain aspects of the invention are concerned, this element may constitute the rotor of an inductive electric device, and this device may have any number of pairs of poles. The element 10, whether it constitutes a rotor or stator, has an even number of slots 11 for receiving the sides of coils, twelve of such slots equally spaced being shown as an example.

Any phase of a coil winding system per pair of poles for an element of an electric device of the general type described having an even number of slots, may be reduced to an inductively corresponding basic coil pattern producing substantially the same output and affording substantially the same electrical performance. This basic coil pattern in connection with the stator 10 of Fig. 1 having twelve slots 11, is shown for one phase consisting of a group of three coils N1, N3 and N5 in six slots, arranged chordally on one side of and parallel to the axis A normal to the polar axis B, and a corresponding group of coils N1, N3 and N5 in the other six slots identical respectively to the coils of the first group and arranged chordally on the other side of and parallel to the axis A, the coils being connected in series and the two groups of coils being symmetrically arranged about said normal axis A. In the arrangement shown in Fig. 1, the coils indicated by N and carrying the same subscript have the same number of turns, so that the two mating coils N1 and N1 on opposite sides of the normal axis A have the same number of turns, mating coils N3 and N3 on opposite sides of said axis have the same number of turns, and mating coils N5 and N5 on opposite sides of said axis have the same number of turns. The number of turns in the coils of a mating pair depends on the type of distribution, i. e. whether it is sinusoidal or 1-3-5 or follows any other type of distribution.

It is known that the voltages induced in the coils of the concentric basic winding shown in Fig. 1, are directly proportional, not only to the number of turns in the coils but also to the pitch factor Kp, where pitch factor is defined by the relation $$Kp = \sin \frac{w}{\tau}\left(\frac{\pi}{2}\right)$$

$w$ being the chording in the slots and $\tau$ the number of slots per pole. Thus, for the basic winding of Fig. 1, the balance of voltage on either side of the axis A would be expressed by the relation $N1 \sin \frac{1}{6}(90°) + N3 \sin \frac{3}{6}(90°) + N5 \sin \frac{5}{6}(90°) =$
$\quad N5 \sin \frac{5}{6}(90°) + N3 \sin \frac{3}{6}(90°) + N1 \sin \frac{1}{6}(90°)$ where N1, N3 and N5 indicate the number of turns in each coil. This equation indicates that voltage balance is preserved in the basic winding.

In accordance with the present invention, the basic coil pattern of Fig. 1 can be replaced by an electrically equivalent coil pattern shown in Fig. 2, to produce substantially the same output and to attain substantially the same electrical performance. This electrically equivalent coil pattern is obtained by eliminating certain of the coils, each from a different mating pair, and doubling up the number of turns in the mates of the eliminated coils. For example, coil N3 on the left hand side of the normal axis A and coils N1 and N5 on the right hand side of the normal axis A in the basic coil arrangement of Fig. 1 are eliminated in the equivalent arrangement of Fig. 2, while the number of turns in the coils N1 and N5 on the left hand side of the normal axis A and in the coil N3 on the right hand side of the normal axis A remaining after this elimination, is doubled in the equivalent arrangement of Fig. 2. As a result, the number of coils in the equivalent coil arrangement is reduced by one-half, thereby simplifying construction and reducing the cost of the winding electrical machinery with distributed windings.

A single phase of the electrical equivalent windings is shown in Fig. 2. For a polyphase system, the transformation of the other phases of the basic coil arrangement to electrically equivalent coil arrangements with reduced coils is repeated in each phase, as shown in Fig. 3. In Fig. 3, a 3-phase Y connection is indicated with 3 phases C, D and E spaced electrically 120° apart. The equivalent C phase in Fig. 3 is indicated in full lines, equivalent phase D is indicated in dot and dash lines and equivalent phase E is indicated in dotted lines, each of these phases having three coils 2N1, 2N3 and 2N5 derived from a corresponding basic phase winding of six coils. (The notations $\phi C$, $\phi D$ and $\phi E$ in Fig. 3 indicate axes parallel to the coils in each phase.)

It should be noted that in the equivalent polyphase system, the coils of one phase extend into slots which are dummies in other phase or phases, so that the total number of conductors per slot, which determines the copper-iron design ratio is not upset to any substantial extent, by the reduction of the winding system from the basic pattern to the reduced electrically equivalent pattern.

Where the reduced equivalent windings of the present invention are applied in polyphase to the rotor of the electric device, the rotor will be dynamically balanced.

Fig. 4 shows a basic phase winding for a two-pole element $10a$ shown as a stator having, as an example, twelve equally spaced slots $11a$, this winding being transformed from a winding system to be equivalently reduced, as in the case of Fig. 1. This basic arrangement of Fig. 4 is different from that of Fig. 1, in that a center coil is provided, split into two identical coils N6, N6, so that this arrangement in effect has six coils N2, N4, N6, N6, N4, N2 divided into two groups of three coils each, symmetrically arranged about the axis F normal to the polar axis G, the center coils N6, N6 occupying the same diametrically opposed slots $11a$. Two of these coils N2 and N4 extend parallel to and are located on one side of the normal axis F, while their counterpart coils N2 and N4 with the same number of turns respectively, extend parallel to and are located on the opposite side of said normal axis. This arrangement in conjunction with center coils N6, N6 in split relationship, leaves two dummy slots $11a$ at diametrically opposite sides of the stator $10a$ along the polar axis G.

The basic winding arrangement of Fig. 4, is reduced in accordance with the present invention to the electrically equivalent winding of Fig. 5, by eliminating the coils N4 on one side of the normal axis G, eliminating the coil N2 on the other side of said normal axis, and doubling the number of turns in the remaining coils N2 and N4, while maintaining the center coils N6, N6 intact in split relationship. The result is a simplified inductively equivalent winding with four coils instead of six coils, having substantially the same output and attaining substantially the same electrical performance.

The equivalent single phase winding arrangement of Fig. 5 may be duplicated in other phases of the machine. In that case, the dummy slots for the single phase will be filled by the coils of the other phase or phases.

The voltage balance per pole may in certain cases be upset by the equivalent winding of the present invention. This condition might be undesirable in certain types of precision electric machines. In order to reestablish the voltage balance per pole, the equivalent distribution may be as shown in Figs. 6 and 7.

Taking as an example, the basic winding arrangement of Fig. 1, instead of eliminating therefrom three coils and doubling the number of turns in the others, as shown in the equivalent distributions of Fig. 2, only two coils N3 and N1 are eliminated, each from a different mating pair, leaving four coils divided into two groups, each consisting of two coils, and arranged on opposite sides of the axis A normal to the polar axis B, as shown in Fig. 6. The turns in the remaining coils N1 and N3 on opposite sides of this normal axis are doubled in the equivalent winding of Fig. 6, while the two coils N5 from the basic arrangement of Fig. 1 are not eliminated, but the total number of turns in the two coils N5, N5 is apportioned in the equivalent winding, to obtain one coil having $2KN5$ number of turns and another coil having $2(1-K)N5$ number of turns, the value of the parameter $K$ being less than one and being such as to establish the desired balance.

In connection with the equivalent winding of Fig. 6, the value of $K$ may be determined for balanced voltage conditions by the relation $$2N1 \sin \tfrac{1}{6}(90°) + 2KN5 \sin \tfrac{5}{6}(90°) =$$
$$2(1-K)N5 \sin \tfrac{5}{6}(90°) + 2N3 \sin \tfrac{3}{6}(90°) \quad (1)$$

and since N1, N3 and N5 have already been determined in the basic winding, Equation 1 offers a simple method for the calculation of $K$, for the example of Fig. 6. This method may also be extended to include the calculation of $K'$ for the configuration of Fig. 7 to be described, as well as any configuration employing a split coil as covered by this invention, with the intention of decreasing the number of coils but preserving voltage balance under the respective poles.

Fig. 7 shows an electrically equivalent winding similar to that of Fig. 6 and derived from the basic distribution of Fig. 1. In this equivalent winding, the coils N3 and N5 on opposite sides of the axis A normal to the polar axis B are eliminated, the number of turns in the remaining coils N3 and N5 is doubled and the total number of turns in the two coils N1 is apportioned to obtain one coil having $2K'N1$ number of turns and another coil having $2(1-K')N1$ number of coils, the value of $K'$ being less than one and being such as to establish the desired balance.

Considering the winding distributions of Figs. 1, 6 and 7, if in Fig. 1

$$E(N1, N3, N5)_{N(\text{pole})} = E(N1, N3, N5)_{S(\text{pole})}$$

then in Fig. 6

$$E(2N1, 2KN5)_N = E(2(1-K)N5, 2N3)_S$$

and in Fig. 7

$$E(2K'N1, 2N5)_N = E(2N3, 2(1-K')N1)_S$$

While the invention has been described with particular reference to specific embodiments, it is to be understood that it is not to be limited thereto but is to be construed broadly and restricted solely by the scope of the appended claims.

What is claimed is:

1. A rotary inductive electric device having an element with an even number of slots and with a distributed winding per phase per pair of poles, electrically equivalent to a basic winding of the type comprising two similar groups of parallel coils on opposite sides of the axis normal to the polar axis, each coil of one group having a counterpart coil with the same number of turns in the other group, the coils in the equivalent winding being arranged and distributed substantially as in the basic winding, except that one or more of the coils of said basic winding are eliminated in said equivalent winding, while the counterparts of the eliminated coils have their turns doubled in number in the equivalent winding.

2. A rotary inductive electric device as described in claim 1, wherein all of the coils of said basic winding are parallel and each occupies a separate pair of chordally opposed slots, and wherein all the coils of the equivalent winding reduced from said basic winding are also all parallel and each occupies a separate pair of chordally opposed slots.

3. A rotary inductive electric device as described in claim 1, wherein said basic winding has a center split coil, while all of the other coils of said basic winding are parallel and each of said parallel coils occupies a separate pair of chordally opposed slots, and wherein the equivalent winding reduced from said basic winding has a centre split coil the same as in the basic winding, and has all of its other coils parallel and each occupying a separate pair of chordally opposed coils.

4. A rotary inductive electric device as described in claim 1, wherein said device is a two-pole machine of the precision type, such as resolvers, rate generators, synchros and potentiometers.

5. A rotary inductive electric device having an element with an even number of slots and with a distributed winding per phase per pair of poles, electrically equivalent to a basic winding of the type comprising two similar groups of parallel coils on opposite sides of the axis normal to the polar axis, each coil of one group having a counterpart coil with the same number of turns in the other group, the coils in the equivalent winding being arranged and distributed substantially as in the basic winding, except that one or more of the coils of said basic winding are eliminated in said equivalent winding, while the counterparts of the eliminated coils have their turns doubled in number in the equivalent winding, and except also that two coils in the equivalent winding on opposite sides of the axis normal to the polar axis corresponding to two counterpart coils of N number of turns in the basic winding have $2KN$ and $2(1-k)N$ number of turns respectively, K having a value necessary to attain substantially voltage balance per pole in the equivalent winding.

References Cited in the file of this patent

UNITED STATES PATENTS

| | | |
|---|---|---|
| 815,863 | Rollinson | Mar. 20, 1906 |
| 2,535,914 | Glass | Dec. 26, 1950 |
| 2,608,682 | Herr | Aug. 26, 1952 |